Feb. 5, 1957  A. K. BREWER ET AL  2,780,589
STILL COLUMN WITH CONCENTRIC CONDENSER
Filed Aug. 10, 1949
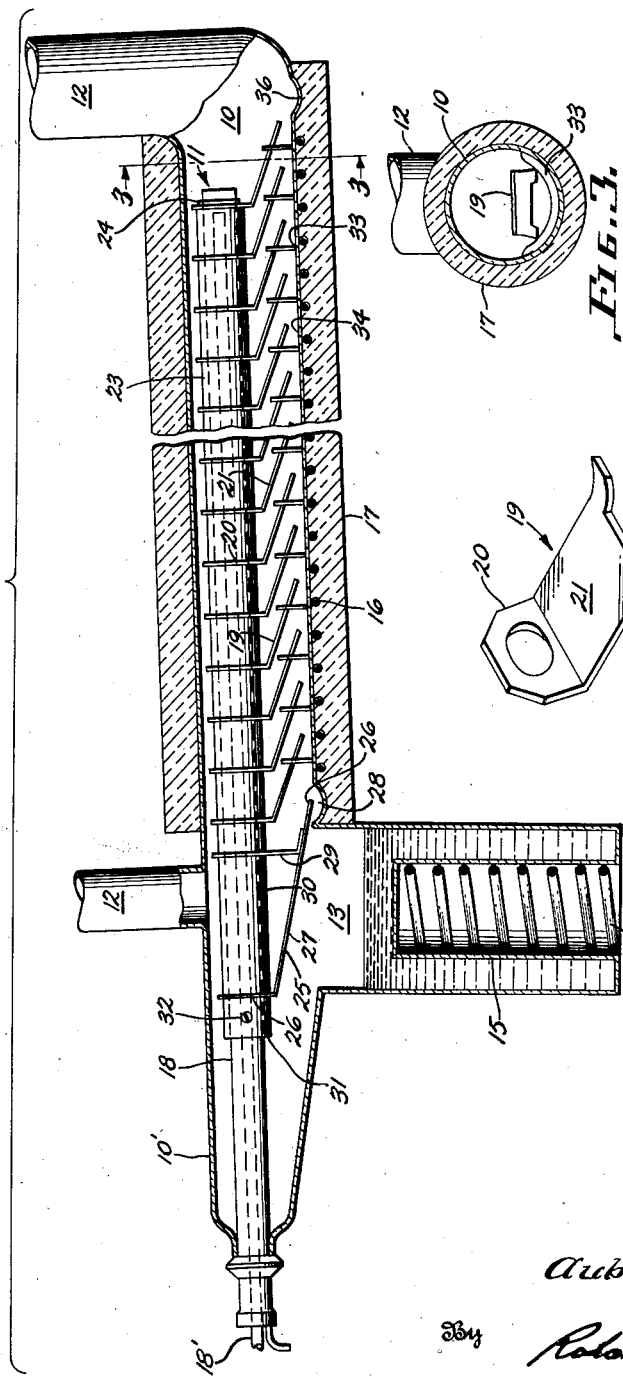
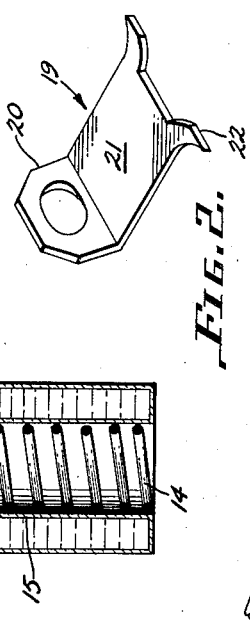
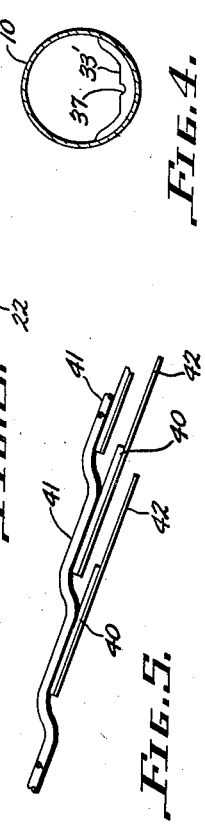
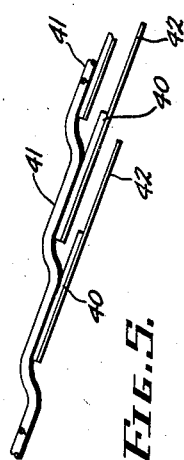
Inventors
T. Ivan Taylor
Aubrey Keith Brewer
By Robert A. Anderson
Attorney

# United States Patent Office 2,780,589
Patented Feb. 5, 1957

2,780,589
STILL COLUMN WITH CONCENTRIC CONDENSER

Aubrey Keith Brewer, Washington, D. C., and T. Ivan Taylor, New York, N. Y., assignors to the United States of America as represented by the United States Atomic Energy Commission Application August 10, 1949, Serial No. 109,628

3 Claims. (Cl. 202—153)

This invention relates to apparatus for high vacuum or molecular distillation.

The separation of isotopes by molecular distillation procedure involving countercurrent reflux and an apparatus for use in that separation are described in a copending application of Aubrey K. Brewer and Samuel L. Madorsky, S. N. 478,844, filed March 11, 1943. This application was patented on August 17, 1948, and is numbered 2,446,997.

That application discloses a countercurrent reflux still including an inclined glass still column within which the distillation is carried out. Liquid to be distilled is flowed down in a stream on the lower side of the still column. This lower side is heated to volatilize portions of the liquid thereon, and the upper side of the column is cooled and serves as a condensing surface. Where the apparatus is to be used for molecular distillation, the cooled side of the column is spaced from the heated side of the column a space less than the mean free path of molecules rising from the heated liquid and the molecules are condensed in substantially the same ratio at which molecules leave the heated liquid. The upper, i. e., cooled side of the column is constructed as a series of inclined surfaces sloping in a direction opposite to the general direction of flow of liquid along the heated surface. Condensate formed on these cooled surfaces flows up-stream in the column and drops to the liquid on the heated surface up-stream of the point at which the material forming the condensate vaporized. This return of condensate at an up-stream point gives a countercurrent flow of liquid condensate with respect to unvaporized liquid flowing downwardly in the column to give improved fractionation of the components of the liquid being distilled.

In carrying out molecular distillation processes, for example, the distillation of uranium polyalkoxides as disclosed in co-pending application S. N. 583,495 of Aubrey K. Brewer, Samuel L. Madorsky and T. Ivan Taylor, filed March 19, 1945 (now U. S. Patent No. 2,727,000, issued December 13, 1955), there are a number of important conditions. Compounds being distilled, e. g. uranium polyalkoxides, may be subject to rapid decomposition in the presence of water, oxygen, air and so forth. It is desirable to employ methods in handling these compounds to prevent hydrolysis, oxidation, or pyrolysis. The distance between the evaporation surface and the condensation surface is dependent to a large extent upon the mean free path of the molecule, and in general the greater the distance between the two surfaces, the greater is the possibility and probability of collisions which interfere with the unidirectional flow of the molecules. Furthermore, the lower the temperature of the condensation surface, the greater is its accumulation accommodation coefficient for condensation with the result that fewer molecules will rebound after striking the condensation surface. The temperature, of course, should be low enough that the liquid upon being condensed will not undergo any substantial amount of "back" evaporation. Temperatures of the condensation surface, such as those obtained with liquid air, have the additional advantage that the vacuum is improved because of the immediate condensation of any decomposition products which might be present or occur during the distillation. Thorough agitation of the distilland at all times is desirable.

Because of the close spacing between heating area and cooling area necessary in conducting a molecular distillation, considerable difficulty has been encountered in securing satisfactory temperature control of the heated and cooled surfaces respectively. Also due to contact between the surfaces, i. e., at the side of the still column, the heat efficiency of such an apparatus has not been high.

It is an object of the present invention to provide an improved high vacuum or molecular distillation still of the countercurrent reflux type.

It is a further object to provide a high vacuum or molecular distillation still of the countercurrent reflux type constructed to provide for more accurate control of temperature of the vaporizing and condensing surfaces.

It is an additional object to provide a high-vacuum or molecular distillation still of the countercurrent reflux type constructed to operate with greater efficiency and at lower condensation temperatures.

In accordance with the instant invention, applicants have devised a novel still suitable for high vacuum or molecular distillation and comprising an inclined still column in combination with an internal condensing and reflux device.

The construction of the apparatus will be more fully described in connection with the accompanying drawings in which Fig. 1 is a sectional elevational view of a molecular still constituting one embodiment of the invention.

Fig. 2 is a detailed perspective view of one form of a condenser plate suitable for use in the still shown in Fig. 1.

Fig. 3 is a cross-section taken on the line 3—3 of an inclined glass column forming a part of the still shown in Fig. 1.

Fig. 4 is a cross-section of a modified glass column suitable for use in a still constructed in accordance with the present invention.

Fig. 5 is a side elevational view of a portion of a modified condensing and reflux member.

A molecular still according to the present invention may comprise (see Fig. 1) an elongated inclined glass column 10, shown sloping downwardly from right to left and condensing and reflux return member indicated generally at 11 disposed therein. Conduits 12 are provided at each end of the glass column for connecting the column to any suitable vacuum producing device, for example, a vacuum pump (not shown). A reservoir 13 is connected at the lower end, i. e., left end, of the glass column for receiving the initial charge of a liquid to be fractionated and a suitable heating element 14 is situated in a recess 15 in the bottom of the reservoir 13 to heat the liquid to cause initial volatilization.

A heating coil 16 extends along the lower side of the glass column and suitable insulation 17 extends completely around the coil 16 and the glass column 10.

The condensing and reflux member 11 comprises a hollow metal support member 18 extending lengthwise into the still portion of column 10, and a series of vanes 19 mounted on the support 18 in heat conducting relationship therewith. The support may comprise a metal tube closed at the end within the distilling portion of the column, and with the other end projecting through a conventional seal in an extension 10' of the column 10 on the side of the reservoir 13 opposite the distilling portion of the column. A tube 18' of smaller diameter extends within tube 18 with its inner end adjacent the closed end of tube 18, so that cooling fluids, e. g., water, liquid, air or other cooling fluid may be introduced into the support to cool the vanes without breaking the vacuum within the distilling column. As shown in Figs. 1 and 2, the vanes 19 comprise a portion 20 having a hole formed therein for engaging the supporting member 18 and a portion 21 extending at an angle to the portion having a hole. Prongs 22 are provided at the edges of the angularly extending portions for a purpose to be explained below. In certain cases it has been found desirable to bend down the prongs of one or more vanes into contact with the sides of the column to maintain the precise spacing between the vaporizing vanes. The vanes are assembled on the support 18 with annular spacing members 23 between individual vanes and with the end vane against an enlargement 24 adjacent to the closed end of the support. Disposed above the reservoir 13 is a large vane 25 having a portion 26 with a hole in it for engagement with the support 18 and a portion 27 at an angle to portion 26 extending across the reservoir 13 and terminating above a recess 28 at the lower end of the column, 10. A brace 29 provided with a hole for engagement with support 18 and having an angular part secured to the upper side of vane 25 cooperates with the vane portion 26 to support the vane 25 in proper position. An annular spacing member 30 is disposed between the vane portion 26 and the brace 29. An annular member 31 provided with a set screw 32 maintains the vanes 19 and 25 and the annular spacing members 23 and 30 clamped together with the end vane against the enlarged portion 24 at the closed end of the support 18.

The column 10 is formed on its interior to control the flow of liquids downwardly along the surface. As shown in Figs. 1 and 3, the bottom may be formed with spaced deformations 33 which serve to divide the flowing liquid into a series of discrete pools 34. Recesses 28 and 36 are formed in the lower side of column 10 at the lower and upper ends of the column respectively.

As shown in Fig. 1, each vane 19 is disposed above an individual pool 34 with the lower edge of each vane slightly past the deformation defining the higher or upstream end of the pool so that any condensate which might so form will enter the pool immediately upstream of the pool beneath the vane. The prongs 22 extend a material distance over the upstream pool, for example, as much as two-thirds of the length of the pool. Condensate from the vane flows along the prongs 22 to their ends and falls from the ends into the pool. These prongs 22 do not interfere with passage of vapors from any given pool to its associated vane but serves to return condensate to a point in the upstream pool where the condensate will have an opportunity to mix thoroughly with the liquid in the upstream pool.

In operation of the column the reservoir 13 is heated by the coil 14 and the lower side of the column 10 is heated by the coil 16. Cooling fluid such as water is passed through the support 18 and cools the support and the vanes 19 and 25 supported thereby. Vapors from the reservoir 13 condense on the vane 25 and run downwardly along the vane and drop from its edge into the recess 28. The condensate in recess 28 is vaporized and the vapors pass to the first vane 19 which is spaced from the surface of the liquid in the recess 28 a distance less than the mean free path of the molecules leaving the liquid so that molecular distillation is effected. Condensate formed on this vane flows down along the vane to a point higher in the column and drops from the edge and the prongs 22 to the heated surface of the column. This condensate in turn vaporizes and passes to a succeeding vane where it is condensed and the process is repeated. In this manner liquid passes up the column in a series of vaporization and condensation stages, eventually reaching the recess 36. During the process of vaporization and condensation liquid condensate of the lower side of the column flows down the column through the successive pools 34 resulting from the damming up of liquid by the indentations 33. When the column has been in operation for a time there will be a continuous flow of liquid condensate down through the pools and a continuous movement of vapors and condensate up the columns. It will be observed that liquid which drops from the lower edges of the vanes 19 or prongs 22 returns to the pool of liquid ahead of the pool from which the material vaporizes. In this manner the up-stream flow of condensate supplies liquid richer in the more volatile component progressively towards the higher end of the column where it fills the recess 36 and floods back through the column as reflux. The downstream flow of liquid through the pool carries the less volatile component progressively down towards recess 28. When the liquid in recess 36 becomes sufficiently rich in the more volatile component and the liquid in recess 28 becomes sufficiently rich in the less volatile component the distillation is discontinued to withdraw liquid products from the recesses.

Fig. 4 discloses a modified form of deformation of the lower side of a glass still column 10'. The deformation 33' of this modification is similar to the deformation in the glass column 10 originally described and functions in the same general manner during a distillation. However, this modification is provided with a notch 37 at its center and gives a somewhat improved throughput of the column under the conditions involved in certain distillations.

A modified condensing and reflux member (Fig. 5) for use in inclined columns such as those described above, comprises a series of vanes 40 soldered, brazed or otherwise secured to a pair of cooled tubes 41 in heat conducting relation therewith. The temperature of these tubes is kept low by flowing a cooling liquid through them. The vanes 40 are provided with a dihedral angle so that the center portion is higher than the edge portions. Condensate formed on these vanes flows downwardly and towards the sides and passes to the prongs 42 at the lower corners of the vanes 40. Suitably, the prongs 42 of one vane extend a considerable distance past the lower edge of the vane so that when the vanes and prongs are disposed in a distilling column with the vanes over individual pools, the prongs will carry condensate from the vanes to a point, for example, two thirds of the length of the immediately upstream pool before returning the condensate to the pool.

The following examples of the operation of fractional molecular distillation stills constructed in accordance with the present invention are given as illustrative only to assist in the understanding of the operation of the invention, and it is to be understood that the invention is not limited to the details given in the examples.

*Example I*

The reservoir of a molecular distillation still comprising a glass column having 380 depressions of the type shown in Fig. 1 spaced apart a distance of 0.6 cm. formed on the lower side and a condensing and reflux return member having a corresponding number of copper vanes, was charged with uranium penta-propylate wherein the uranium was the normal isotopic mixture. The temperature of the reservoir and of the lower side of the glass column was raised to 180° C. while the temperature of the vanes was brought to about 20°–30° C. The residual gas pressure within the still was reduced to $10^{-4}$ mm. After operation of the column under these conditions for 360 hours, it was found that the liquid in the upper end of the column was enriched in the penta-propylate compound of $U^{235}$ to the extent of $1.74 \pm 0.15\%$ over the concentration of the $U^{235}$ compound in the original mixture.

*Example II*

The reservoir of a molecular distillation still comprising a glass column having 147 depressions of the type shown in Fig. 1 spaced apart a distance of 1.5 cm. formed on the lower side and a condensing and reflux return member having a corresponding number of aluminum vanes was charged with uranium penta-ethylate wherein the uranium was the normal isotopic mixture. The temperature of the reservoir and of the lower side of the glass column was raised to 142° C. while the temperature of the vanes was brought to about 20°–30° C. The residual gas pressure within the still was reduced to about $10^{-4}$ mm. After operation of the column under these conditions for 590 hours, it was found that the liquid in the upper end of the column was enriched in the penta-ethylate compound of $U^{235}$ to the extent of 5.5±0.3% over the concentration of the $U^{235}$ compound in the original mixture.

*Example III*

The reservoir of a molecular distillation still comprising a glass column having 110 depressions of the type shown in Fig. 4 spaced apart a distance of 2 cm. formed on the lower side and a condensing and reflux return member having a corresponding number of aluminum vanes varying from 1 to 2 cm. distance from the evaporating surface associated therewith was charged with uranium penta-ethylate wherein the uranium was the normal isotopic mixture. The temperature of the reservoir and of the lower side of the glass column was raised to 125° C. while the temperature of the vanes was brought to about 20°–30° C. The residual gas pressure within the still was reduced to about $10^{-4}$ mm. After operation of the column under these conditions for 945 hours, it was found that the liquid in the upper end of the column was enriched in the penta-ethylate compound of $U^{235}$ to the extent of 5.2±0.3% over the concentration of the $U^{235}$ compound in the original mixture.

The use of a fractional molecular distillation apparatus according to the present invention comprising a metal condensing and reflux return member disposed wholly within a column gives a significant improvement in operating characteristics. Because of the better conductivity characteristics of the metal vanes as compared with a glass surface, lower condensation temperatures may be employed. This new construction avoids the wastage of heat and other difficulties necessarily involved due to close spacing of heating and cooling portions of previously known fractional molecular distillation columns. Also the structure is relatively simple and easy to construct.

It will be appreciated from the description that various modifications can be made in the apparatus without departing from the spirit of the invention. Thus the parts may be varied somewhat in size and shape. The column need not be made of glass but might be made of other corrosion resistant substantially inert material. The condensing vanes may be made of any suitable metal such as aluminum, copper or the like. Accordingly, it is to be understood that the invention is not limited to the apparatus disclosed but is considered to include all structure which as a matter of language may be held to fall within the scope of the appended claims.

We claim:

1. A still column comprising an inclined shell member, means for heating a lower portion of the wall of the shell member, means for flowing a stream of liquid in a series of pools through said shell in heat exchange relation with said lower portion of the wall, a cooling and condensing member within the shell comprising a cooled support and a plurality of vanes secured to said support in heat conducting relation, said vanes being shaped and arranged to condense vapors from said stream of liquid and to carry condensate formed thereon forward and return it to the lower portion of the shell member to the central portion of the next pool up-stream from the pool wherein were evolved the vapors which formed the condensate.

2. A molecular still column comprising an inclined nonmetallic shell member, means for heating a lower portion of the wall of the shell member, means for flowing a stream of liquid in a series of pools through said shell in heat exchange relation with said lower portion of the wall, a cooling and condensing member within the shell comprising a cooled support and a plurality of metal vanes secured to said support in heat conducting relation, said vanes being disposed a distance from the stream less than the mean free path of the molecules being vaporized and being inclined downwardly in a direction opposed to the direction of the flow of the stream of liquid so that the vanes will carry condensate formed thereon forward and return it to the lower portion of the shell member to the central portion of the next pool up-stream from the pool wherein were evolved the vapors which formed the condensate.

3. A multistage molecular still column comprising an inclined shell member, means for heating a lower portion of the wall of the shell, spaced arcuate partitions secured to the lower wall of the shell to segregate liquid in the shell into a series of pools, a reservoir at the downstream end of the column to provide a source of liquid for the still column, heating means for said reservoir, a cooling and condensing member within the shell comprising a tubular supporting means, a cooling tube within the supporting means in heat exchange relationship with said supporting means, means for flowing coolant through said cooling tube, and a plurality of metal vanes secured to said supporting means, a vane being disposed over each of said pools and extending downwardly in a direction opposed to the flow of liquid in the series of pools to a point adjacent the central portion of the next adjacent upstream pool, whereby condensate formed on said vane is carried to the central portion of the next pool upstream of the pool wherein the vapors forming the condensate were evolved.

References Cited in the file of this patent

UNITED STATES PATENTS

| | | |
|---|---|---|
| 2,406,421 | Wollner et al. | Aug. 27, 1946 |
| 2,443,070 | Hobbie | June 8, 1948 |
| 2,562,153 | Taylor | July 24, 1951 |
| 2,586,717 | Robinson | Feb. 19, 1952 |
| 2,609,335 | Hickman | Sept. 2, 1952 |
| 2,727,000 | Brewer et al. | Dec. 13, 1955 |

OTHER REFERENCES

Brewer et al.: Bureau of Standards, Research Paper RP 1764, vol. 38, pp. 129–135 (January 1947); title "Concentration of the Isotopes of Mercury by Free Evaporation in a 10-Cell Counter-Current Reflux Still."